Oct. 25, 1960  H. W. BROWN  2,957,566
SPINDLE POSITIONING DEVICE
Filed Sept. 11, 1958  3 Sheets-Sheet 1

INVENTOR.
HARRY W. BROWN
BY Woodling & Krost
ATTORNEYS

Oct. 25, 1960   H. W. BROWN   2,957,566
SPINDLE POSITIONING DEVICE
Filed Sept. 11, 1958                                 3 Sheets-Sheet 2
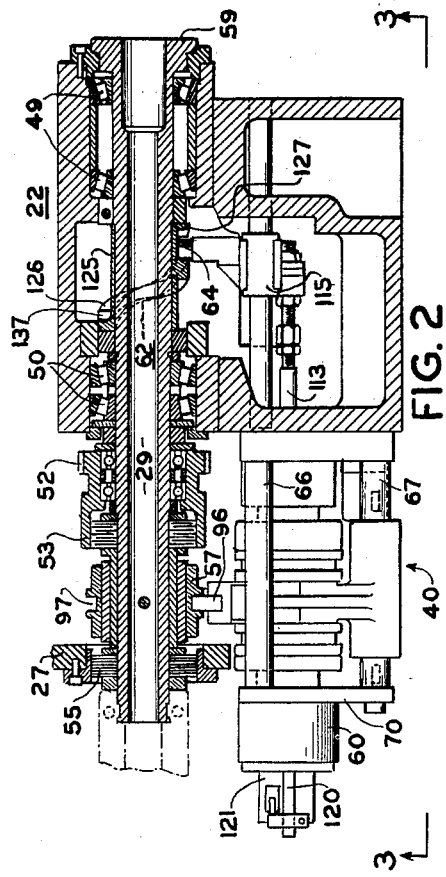
FIG. 2
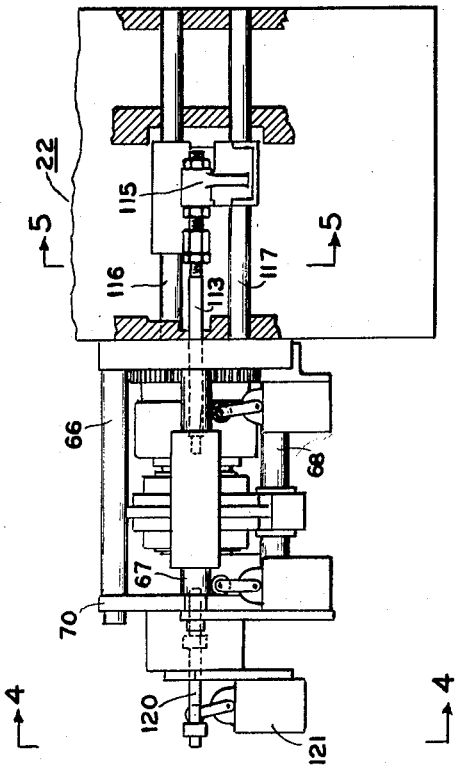
FIG. 3
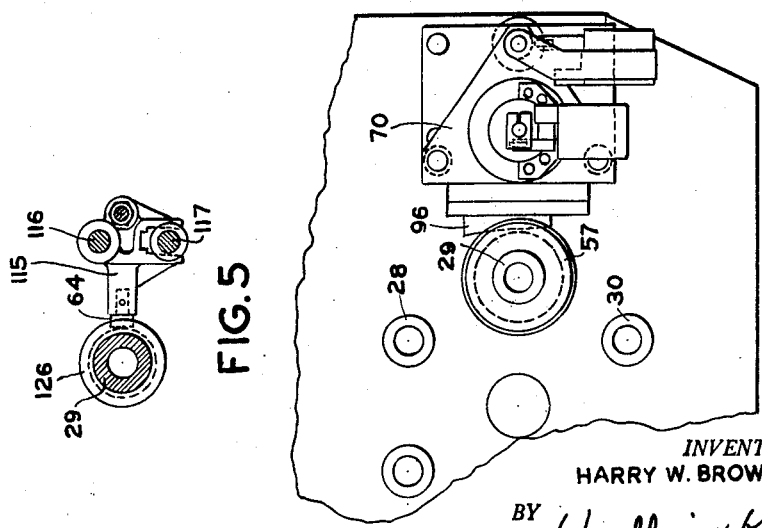
FIG. 4
FIG. 5
INVENTOR.
HARRY W. BROWN
BY Wavelling & Kroet
ATTORNEYS

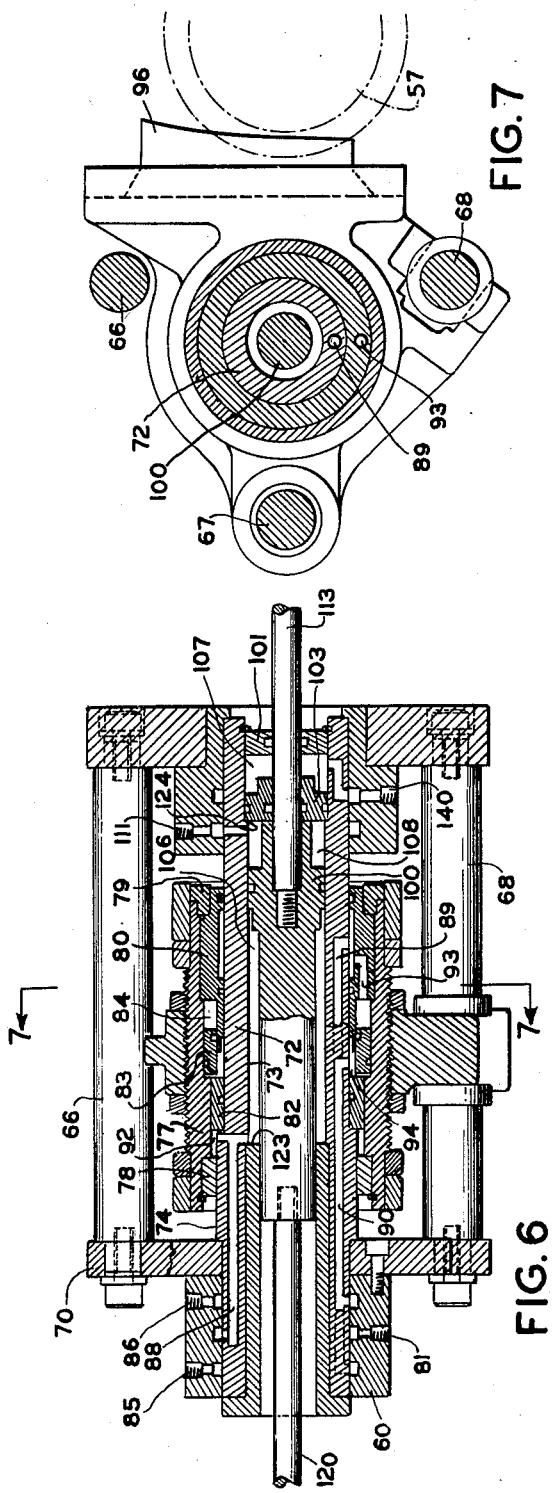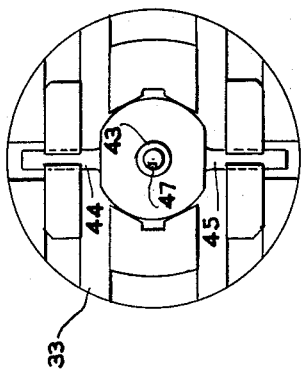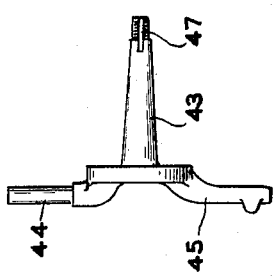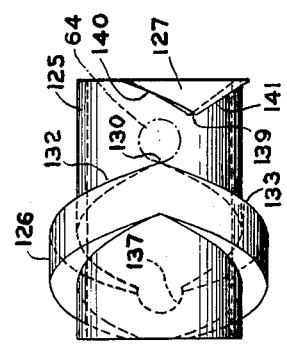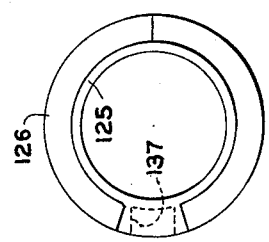

United States Patent Office 2,957,566
Patented Oct. 25, 1960

2,957,566

SPINDLE POSITIONING DEVICE

Harry W. Brown, Willowick, Ohio, assignor to National Acme Company

Filed Sept. 11, 1958, Ser. No. 760,366

8 Claims. (Cl. 192—149)

The invention relates in general to means for locating a member in a predetermined position and more particularly to a device for positioning the spindle of a machine tool in a predetermined angular position.

The present invention has application for example in single and multiple spindle chucking machines where parts to be machined have odd shapes and the parts have to be located in a predetermined position in a chuck or adapter. In such case it is necessary to stop the machine spindle in an exact position when the parts are to be handled automatically with a magazine loading device. The spindle also has to be stopped in an exact position when it is necessary to perform a separate drilling or milling operation in relation to the shape of the part.

It is therefore an object of the present invention to provide a device which will position a spindle in a predetermined position.

Another object of the invention is to provide a spindle locating device for positioning a spindle in a predetermined angular position whereby work may be performed on a part whose angular position is dependent upon the angular position of the spindle.

Another object of the invention is to provide a spindle positioner which includes a cam on the spindle which is engageable by a cam roller which causes rotational movement of the spindle to a predetermined position whereupon the cam roller and cam are locked in position and the spindle is held in position while work is being performed on a part.

Another object of the invention is to provide a locating cam on a spindle which includes a first cam having a high portion which first cam is engageable by a cam roller, with a means for assuring that the roller does not engage the high portion of the first cam.

Figure 2 is an enlarged view partially in section taken generally along the line 2—2 of Figure 1.

Figure 3 is a view partially in section taken generally along the line 3—3 of Figure 2.

Figure 4 is a view taken generally along the line 4—4 of Figure 3 and indicating the relative positions of the spindles of the chucking machine.

Figure 5 is a view taken generally along the line 5—5 of Figure 3.

Figure 6 is an enlarged view in section of the actuating cylinder and piston mechanism shown in Figures 2 and 3.

Figure 7 is a view taken generally along the line 7—7 of Figure 6.

Figure 8 is a side elevational view of the positioning cam.

Figure 9 is an end view of the cam shown in Figure 8.

Figure 10 is a side elevational view of a work piece which may be handled and machined by the chucking machine of Figure 1; and Figure 11 is an end view of the work piece shown in Figure 10 as held by a chuck of the machine shown in Figure 1.

Figure 1:
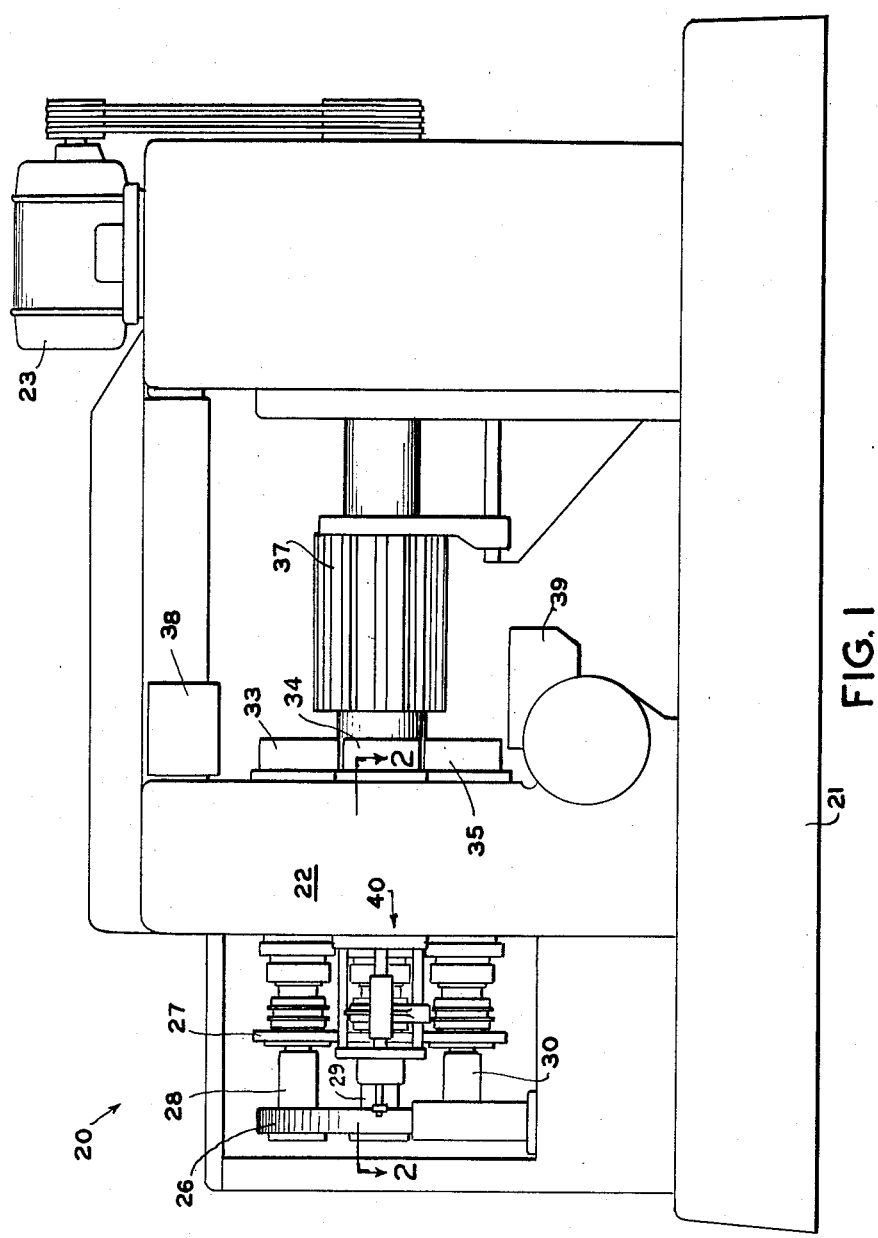
Figure 1 is a side elevational view showing the environment of the spindle positioning device of the present invention as utilized in conjunction with a multiple spindle chucking machine.

As mentioned, hereinabove, the teachings of the present invention may be utilized in positioning the spindles of numerous machine tools including single and multiple spindle bar machines. Figure 1, however, is a showing of how the spindle positioning device may be utilized in a multiple spindle chucking machine. The multiple spindle chucking machine 20 shown in Figure 1 includes generally a base 21 mounting a head stock 22 and a main drive motor 23. The left hand of the machine is provided with a spindle carrier 26, and 27 which serves to journal, in this instance, six spindles thereon, three of which are seen in this figure (28, 29, and 30). The respective spindles are adapted to carry and rotatively move chucks 33, 34 and 35 which carry work pieces upon which machining operations are to be performed. The spindle carrier 26, 27 is adapted to rotate about its axis to successively carry each of the spindles through six positions. An end tool slide 37 and upper and lower slides 38 and 39 respectively form a part of the chucking machine and are adapted to mount tools thereon which perform various machining operations upon the work pieces held by the chucks. The spindle positioning device of the present invention has been indicated generally by the reference numeral 40 and has been shown in Figure 1 as positioned adjacent and adapted to cooperate with spindle 29.

In the chucking machine of Figure 1, only one spindle locating device has been utilized since the specific example each of the spindles (and its associated chuck) needed to be located in a predetermined angular position only in this one position of the spindle carrier. The reason for this is that in this example a machining operation is to be performed which has to be in specific relation to the odd shape of the piece to be machined. Figure 10 shows in detail an odd shaped forging 43 having arms 44 and 45. A tapered portion of the forging is provided with a slot 47 which is provided by a milling operation and this slot has to be located in each piece in exactly the same position in which it is shown in Figures 10 and 11. In other words, it has to occupy a specific angular position relative to the arms 44 and 45. It will also be appreciated that when the piece is loaded in the chuck 33 by an automatic loading device the chuck must be in a specific angular position relative to the forging so the odd shape of the arms 44 and 45 will fit into its designed position in the chuck. The spindle positioning device of the present invention assures that the spindle and the chuck which is carried thereby is positioned consistently in an exact predetermined angular position.

Figure 2 shows spindle 29 and the spindle positioning device 40 in much more detail than shown in Figure 1.

The spindle 29 is journaled upon bearings 49 and 50 and is adapted to be rotated by means of a gear 52 through a clutch 53. By the same token, the spindle 29 may be braked to a stop through a brake 55. The clutch 53 and the brake 55 are selectively operated by means of a collar 57 which surrounds the spindle between the clutch and the brake and which is axially movable to the right to engage the clutch or to the left to engage the brake. The position in which the collar is shown in Figure 2 is in its neutral position. The chuck 33 which is associated with the spindle 29 has been omitted from Figures 2 and 3, however, this chuck is adapted to be mounted upon an end face 59 of the spindle 29.

The spindle positioning device 40 includes generally an actuating cylinder and distributor mechanism 60, a cam 62 and a cam roller 64. The spindle positioning device 40 as mentioned hereinabove, is mounted adjacent a position of the spindles and this is accomplished by means of tie rods 66, 67, and 68 which are mounted at one end portion to the head stock 22 and at the other end, thereof, securing a plate 70 in position. The cylinder and distributor mechanism 60 (Figure 6) comprises a fixed inner cylinder 72 which has an inner surface 73 and an outer surface 74. An outer cylinder 77 surrounds and is slideable on the outer surface 74 of the inner cylinder 72. The outer cylinder 77 includes members 78, 79, 80 and for the purpose of discussing the operation of the instant device, may be regarded as a single member. Positioned between the cylinder 72 and the cylinder 77 is a spacer 82 which is fixed to the inner cylinder 72 by means of a pin which is not shown. There is, therefore, only relative movement between the spacer 82 and the outer cylinder 77. Positioned adjacent the spacer 82 is a free floating piston 83 which is capable of moving within the limits of the chamber 84 in which it resides. Three inlet ports 81, 85 and 86 are provided in the left end of the fixed cylinder 72 (Figure 6) and these ports, by way of associated passageway means 88, 89 and 90 respectively, provide communication to chambers 92, 93 and 94 respectively. The outer cylinder 77 is threadably secured to a collar moving member 96 which is adapted to reside in a groove 97 in the collar 57 to move the collar between neutral, clutch, and brake positions. Fluid under constant pressure is always communicated to chamber 92 by way of port 81 and passageway 88. Fluid is either introduced into chambers 93 and 94 or exhausted therefrom by way of a valving arrangement which has not been shown and this is predetermined according to the control system which controls the operating cycle of the machine.

In the neutral position in which the collar moving member 96 is shown, a constant hydraulic pressure is maintained in chamber 92 and a predetermined hydraulic pressure is contained in chamber 93. The pressure in chamber 92 acts to move the outer cylinder to the left, as seen in Figure 6, and the pressure in chamber 93 acts to move the outer cylinder to the right. The effective area in chamber 93 is greater than the effective area in chamber 92 and as a result the outer cylinder is moved to the right to a point which is determined by the engagement of the free floating piston 83 with the outer cylinder. As will be noted, the pressure in chamber 93 exerts a force against the outer cylinder as well as against the free floating piston. As a result, the outer cylinder may move to the right to the position shown in Figure 6 and thereafter can move no further. To actuate the clutch, the hydraulic fluid is exhausted from chamber 93 and hydraulic fluid is introduced into chamber 94. This moves the free floating piston 83 to its extreme right position as viewed in Figure 6 and since the effective area is greater in this chamber than in chamber 92, the outer most cylinder will move to its extreme right position which is the clutch position and which through the collar moving member 96 and the collar 57 causes the clutch 53 to be engaged and causes the spindle 29 to be rotated by means of the gear 52. In order to disengage the clutch and actuate the brake 55, it is necessary to exhaust the hydraulic fluid from both chambers 93 and 94, respectively. With fluid exhausted from these two chambers the hydraulic fluid in chamber 92 causes a force to be asserted on the outer cylinder which tends to move the same to the extreme left as viewed in Figure 6. In this position the brake 55 is actuated and the spindle 29 is secured from rotative movement.

Positioned in the fixed cylinder 72 and slidable on the inner surface 73 thereof is a piston 100. The right hand inner end of the fixed cylinder is closed by means of a member 101 and located between the piston 100 and member 101 is a floating piston 103. The piston 103 forms chambers 107 and 108 and another chamber 106 is formed between the piston and fixed cylinder. Chamber 106 is provided with a constant supply of hydraulic fluid under pressure by the same means as chamber 92. Chamber 107 is supplied with hydraulic fluid from a port 140 and chamber 108 is supplied with hydraulic fluid from a port 111. The floating piston 103 is capable of movement between the member 101 and the right hand shoulder 124. Threadably secured to the right hand end of piston 100 is a positioning rod 113 which extends through piston 103 and connects with a bracket 115 which is slidably mounted on rods 116 and 117 (Figures 2, 3, and 5). The bracket 115 journals the cam roller 64. Secured to the left hand end of piston 100 is a control rod 120 which by way of a limit switch 121 controls the travel of the piston.

The piston 100, as well as the positioning rod and the parts which are secured thereto, are movable between neutral, cam adjustment and spindle locating positions. The piston, as shown in Figure 6 is in the neutral position and in this position fluid pressure is contained in chambers 106 and 107. Since the effective area of chamber 107 is greater than chamber 106, the floating piston 103 will be caused to move to the left as viewed in Figure 6, pushing in front of it the piston 100 until it meets the resistance of a shoulder 124 on the fixed cylinder 72. To cause the piston 100 to move to the right or in other words to the cam adjustment position. It is necessary that hydraulic fluid pressure be exhausted from chambers 107 and 108. With this accomplished the constant fluid pressure in 106 moves the piston 100 to the right until this piston has pushed the floating piston 103 into contact with the member 101. To cause the piston 100 to move to its extreme left position or in other words to spindle locating position it is necessary that hydraulic fluid be exhausted from chamber 107 and hydraulic fluid under pressure be introduced into chamber 108. This causes the piston to move to the left against the opposition of pressure in chamber 106 until the piston engages a shoulder 123 on cylinder 72.

A cylindrical cam sleeve 125 (Figures 2, 8, and 9) is mounted on spindle 29 and a similar cam sleeve is secured to each of the other spindles of the machine. The cam sleeve 125 has first and second cams 126 and 127 respectively, integrally formed thereon. The first cam 126 is provided with a high point 130 and first and second cam surfaces or portions 132 and 133 respectively, which extend axially and angularly in opposite directions from the high point to meet at a low point, which is substantially 180° removed from the high point. A semi-circular locking groove 137 is located at the low point and is adapted to receive the cam roller 64. The cam roller is indicated in Figure 8 by dot-dash lines. The second cam is also provided with a high point 139 and cam surfaces or portions 140 and 141 which extend axially and angularly from the high point 139. It will be specifically noted that the high point 139 on the second cam is axially and angularly spaced from the high point 130 on the first cam 126. By the same token, the second cam is positioned so that one of the cam surfaces thereon is in angular alignment with the high point 130 on the first cam. The reason for this particular construction will be discussed in detail hereinafter.

In operation, assume that the spindle 29, which mounts its associated chuck, which in turn carries a work piece, has been rotating during a machining operation and it is desired to position the spindle in a predetermined angular position prior to a machine operation such as that described hereinabove in conjunction with Figures 10 and 11. It is required that the spindle be brought to a stop by means of brake 55. To accomplish this end, hydraulic fluid is exhausted from chambers 93 and 94 (Figure 6) and as a result, the constant pressure in chamber 92 causes the outer cylinder to move to the extreme left which moves the collar 57 by way of the member 96 into position to engage the brake. After the spindle comes to a stop, the brake is released and collar 57 moves to neutral by introducing fluid under pressure into chamber 84. After this has been done, the piston 100 and as a result the positioning rod 113, is caused to move to the right as viewed in Figures 2, 3 and 6 to a cam adjustment position. To accomplish this end, fluid pressure is exhausted from chambers 107 and 108 and the constant pressure in chamber 106 causes the piston and positioning rod 113 to move to the right. This causes the bracket 115 and the cam roller 64 which is carried thereby to also move to the right. The roller 64, as a result of this, moves into engagement with the cam surface 140 (Figure 8) on the second cam 127 and causes cam and the spindle 29 to move in a clockwise position as viewed in Figure 9. After this movement has taken place, the cam roller is moved in the opposite direction and engages cam surface 132 on the first cam 126. This causes rotation of the cam sleeve 125 and spindle 29 in a clockwise direction until the cam roller 64 is located in the locking groove 137 at which time further rotation is prevented and the spindle is located in a predeterminated position. This movement just described, is caused by hydraulic fluid being exhausted from chamber 107 and being introduced into chamber 108 which causes the piston 100 to move to the left until it engages shoulder 123. While located in this position, the machining operation, to put the slot 47 in the work piece of Figure 10, may be accomplished since the work piece is now locked in a predetermined angular position. After this mentioned machining operation has been accomplished the cam roller 64 is moved to its neutral position (Figure 8) and this is accomplished by exhausting the pressure in chamber 108 and introducing fluid under pressure into chamber 107. After the cam roller 64 has been moved back to the neutral position it is then possible to engage the clutch to rotate the spindle again or to index the spindle carrier to move the next spindle into position along side the spindle positioning device.

It will thus be seen that the present invention has provided a device which is capable of locating a rotatable member in a predetermined angular position. When the present invention is applied to a rotatable spindle in the machine tool art, it is possible to locate the work spindle in a predetermined position. With this accomplished work may be done on a work piece at a predetermined place and on subsequent work pieces at the same place. In using automatic loading devices on odd shaped parts the parts may also be loaded without difficulty and consistently. In the instant device the cam roller must first move into engagement with the second cam or in the direction of the second cam before it moves into engagement with the first cam. With this construction and operation it is impossible for the cam roller to get hung up on the high point 130 of the first cam. When the roller 64 is located opposite the high point 130 on cam 126 as shown in Figure 8 this may be referred to as the dead center position of the first cam and roller and the dead center position of the second cam and roller is when the roller is opposite the high point 139. The second cam in other words, insures that the roller, during its positioning movement, will not engage the high point. This assures that the spindle will be located each time. The provision of the locking groove in the first cam also insures that once the spindle is located it will be held in position while the desired machining operation is performed thereon.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. An automatic chucking machine including in combination a work spindle, brake and clutch means for controlling said work spindle, a spindle positioner comprising a hydraulic-actuating mechanism, means for mounting said mechanism adjacent said work spindle, said mechanism comprising a fixed inner cylinder having inner and outer surfaces, an outer cylinder surrounding and slidable on said outer surface of said inner cylinder, means for moving said outer cylinder between brake, drive and neutral positions, a piston positioned in and slidable on said inner surface of said inner cylinder, means for moving said piston between neutral, cam adjustment and spindle locating positions, a collar member driven by movement of said outer cylinder to selectively actuate said clutch and brake means and place said work spindle in neutral, a cylindrical cam sleeve secured to said work spindle, first and second cams on said cam sleeve, said first cam having a high point and portions extending axially and angularly therefrom to meet at a low point substantially 180 degrees from said high point, a semicircular locking groove at said low point of said first cam, said second cam having a high point and portions extending axially and angularly therefrom, said high point on said second cam being axially and angularly spaced from said high point on said first cam, one of said portions of said second cam being angularly in line with said high point on said first cam, a positioner rod secured to and moved in accordance with said piston of said hydraulic-actuating mechanism, a cam roller carrier connected to said positioner rod, a cam roller mounted by said carrier adjacent said cylindrical cam sleeve, said cam roller in said neutral position of said piston residing between said high points of said first and second cams, movement of said piston to said cam adjustment position in the neutral position of said work spindle causing said cam roller to engage said second cam and movement of said piston to said spindle locating position causing said cam roller to engage one of said portions of said first cam and rotate said work spindle until said cam roller locates in said semicircular locking groove to secure and locate said work spindle.

2. A chucking machine including in combination, a work spindle, brake and clutch means for controlling said work spindle, a spindle positioner comprising an actuating mechanism, means for mounting said mechanism adjacent said work spindle, said mechanism comprising a fixed inner cylinder having inner and outer surfaces, an outer cylinder surrounding and slidable on said outer surface of said inner cylinder, means for moving said outer cylinder between brake, drive and neutral positions, a piston positioned in and slidable on said inner surface of said inner cylinder, means for moving said piston between neutral, cam adjustment and spindle locating positions, a member driven by movement of said outer cylinder to selectively actuate said clutch and brake means and place said work spindle in neutral, a cam sleeve secured to said work spindle, first and second cams on said cam sleeve, said first cam having a high point and portions extending axially and angularly therefrom, said first cam having a semicircular locking groove, said second cam having a high point and portions extending axially and angularly therefrom, said high point on said second cam being axially and angularly spaced from said high point on said first cam, one of said portions of said second cam being angularly in line with said high point on said first cam, a positioner rod secured to and moved in accordance with said piston of said actuating mechanism, a cam roller carrier connected to said positioner rod, a cam roller mounted by said carrier adjacent said cylindrical cam sleeve, said cam roller in said neutral position of said piston residing between said high points of said first and second cams, movement of said piston to said cam adjustment position in the neutral position of said work spindle causing said cam roller to engage said second cam and movement of said piston to said spindle locating position causing said cam roller to engage one of said portions of said first cam and rotate said work spindle until said cam roller locates in said semicircular locking groove to secure and locate said work spindle.

3. A machine including in combination a work spindle, brake and clutch means for controlling said work spindle, a spindle positioner comprising an actuating mechanism, means for mounting said mechanism adjacent said work spindle, said mechanism comprising a fixed inner cylinder having inner and outer surfaces, an outer cylinder surrounding and slidable on said outer surface of said inner cylinder, means for moving said outer cylinder between brake, drive and neutral positions, a piston positioned in and slidable on said inner surface of said inner cylinder, means for moving said piston between neutral, and spindle locating positions, a member driven by movement of said outer cylinder to selectively actuate said clutch and brake means and place said work spindle in neutral, a cam connected to said work spindle, said cam having a high portion and a low portion, a locking groove at said low portion of said cam, a positioner rod secured to and moved in accordance with said piston of said actuating mechanism, a cam roller carrier connected to said positioner rod, a cam roller mounted by said carrier adjacent said cam member, movement of said piston to said spindle locating position in the neutral condition of said work spindle causing said cam roller to engage said cam and rotate said work spindle until said cam roller locates in said locking groove to secure and locate said work spindle.

4. A machine including in combination a spindle, brake and clutch means for controlling said spindle, a spindle positioner comprising an actuating mechanism, means for mounting said mechanism adjacent said spindle, said mechanism comprising a fixed inner cylinder having inner and outer surfaces, an outer cylinder surrounding and slidable on said outer surface of said inner cylinder, means for moving said outer cylinder between brake, drive and neutral positions, a piston positioned in and slidable on said inner surface of said inner cylinder, means for moving said piston between neutral and spindle locating positions, a member driven by movement of said outer cylinder to selectively actuate said clutch and brake means and place said spindle in neutral, a cam connected to said work spindle, said cam having a locking groove thereon, a cam follower driven by said piston, movement of said piston to said spindle locating position in the neutral position of said spindle causing said cam follower to engage said cam and rotate said spindle until said cam follower locates in said locking groove to locate said spindle.

5. A device for angularly locating a rotatable member including in combination first and second cam members connected to said rotatable member and being axially spaced from each other a first distance, each said first and second cam members having a high portion, said high portions of said first and second cam members being angularly offset with respect to each other, a cam roller having a dimension less than said first distance positioned between said first and second cam members and in this position permitting rotation of said rotatable member without engagement of said cam roller with said cam members, means for moving said cam roller axially in a direction to engage said second cam member to insure that said cam roller is angularly offset with respect to said high portion of said first cam member, means for moving said cam roller in another axial direction to engage said first cam member and rotate said rotatable member, and a locking groove on said first cam member for receiving said cam roller to locate said rotatable member in a predetermined angular position.

6. A device for angularly locating a rotatable member including in combination first and second cam members connected to said rotatable member and being axially spaced from each other a first distance, each said first and second cam members having a high portion, said high portions of said first and second cam members being angularly offset with respect to each other, a cam having a dimension less than said first distance positioned between said first and second cam members and in this position permitting rotation of said rotatable member without engagement of said cam with said cam members, means for moving said cam axially in a direction to engage said second cam member to insure that said cam is angularly offset with respect to said high portion of said first cam member, and means for moving said cam in another axial direction to engage said first cam member and rotate said rotatable member.

7. A device for angularly locating the work spindle of a machine including in combination first and second cam members operably connected to said spindle, each said first and second cam members having a dead center portion, said dead center portions of said first and second cam members being offset with respect to each other, a cam positioned adjacent said first and second cam members with said first and second cam members each being spaced from said cam in such manner that unrestricted rotation of said spindle is permitted, means for moving said cam in a direction so as to engage said second cam member to insure that said cam is offset with respect to said dead center portion of said first cam member, means for moving said cam in another direction to engage said first cam member and rotate said spindle to a predetermined position.

8. A machine including in combination a spindle, brake and clutch means for controlling said spindle, a spindle positioner comprising first and second cam members connected to said spindle and being spaced from each other a first distance, a cam positioned adjacent said first and second cam members with said first and second cam members each being spaced from said cam in such manner that unrestricted rotation of said spindle is permitted in its neutral position, means for moving said cam in a direction so as to engage said second cam member to insure that said cam is in an operative position with respect to said first cam member, and means for moving said cam in another direction to engage said first cam member and rotate said spindle to a predetermined position.

References Cited in the file of this patent

UNITED STATES PATENTS

| | | |
|---|---|---|
| 174,590 | Tesseyman | Mar. 7, 1876 |
| 823,883 | Liggett | June 19, 1906 |
| 2,214,785 | Wells | Sept. 17, 1940 |
| 2,641,133 | Barkalow et al. | June 9, 1953 |
| 2,646,152 | Retz | July 21, 1953 |
| 2,677,169 | Cybulski | May 4, 1954 |
| 2,716,344 | Seifried | Aug. 30, 1955 |
| 2,769,941 | Elliott | Nov. 6, 1956 |